(12) United States Patent
Vodicka

(10) Patent No.: US 6,309,303 B1
(45) Date of Patent: Oct. 30, 2001

(54) SLIP CLUTCH FOR A TUBE CLEANER

(76) Inventor: Glen A. Vodicka, 812 Oceola Dr., Algonquin, IL (US) 60102

(*) Notice: Subject to any disclaimer, the term of this patent is extended or adjusted under 35 U.S.C. 154(b) by 0 days.

(21) Appl. No.: 09/459,509

(22) Filed: Dec. 13, 1999

(51) Int. Cl.[7] ............................. F16D 7/02; F16D 43/20
(52) U.S. Cl. ........................ 464/30; 464/41; 464/185; 192/56.1
(58) Field of Search ................... 464/30, 34, 40, 464/41, 45, 46, 47, 51, 54, 160, 185, 179; 142/56.1

(56) References Cited

U.S. PATENT DOCUMENTS

| | | |
|---|---|---|
| 1,575,256 | 3/1926 | Del Rio . |
| 1,651,585 | 12/1927 | Clair . |
| 1,826,798 | 10/1931 | Lee . |
| 2,057,842 | 10/1936 | Nielsen . |
| 2,533,973 * | 12/1950 | Starkey ................................ 464/54 |
| 2,601,012 * | 6/1952 | Wolff ................................. 192/56.1 |
| 2,743,803 * | 5/1956 | Ferris ................................ 192/56.1 |
| 2,757,406 | 8/1956 | Decker . |
| 3,869,747 * | 3/1975 | Richter ........................... 15/104.1 R |
| 4,280,606 * | 7/1981 | Taylor ............................... 192/56 C |
| 4,581,787 | 4/1986 | Torigoe et al. . |
| 4,846,895 * | 7/1989 | Rabe ................................ 134/22.11 |
| 5,480,015 * | 1/1996 | Yang ................................. 192/56.1 |
| 5,787,644 * | 8/1998 | Thomsen, Jr. ....................... 49/351 |
| 5,845,757 * | 12/1998 | Csonka ........................... 192/105 BA |

* cited by examiner

Primary Examiner—Lynne H. Browne
Assistant Examiner—Kenn Thompson
(74) Attorney, Agent, or Firm—Matthew R. P. Perrone, Jr.

(57) ABSTRACT

A clutch device is adapted to fit onto a drive shaft of a standard water pressure cavity machine. The clutch device has a clutch body with a shaft receiving aperture at one end of the clutch body and a spring assembly at the other end of the clutch body. Reciprocating jaws are held in position by the spring assembly.

14 Claims, 2 Drawing Sheets

SLIP CLUTCH FOR A TUBE CLEANER

This invention relates to a device for cleaning a tube and more particularly to a flexible shaft for cleaning a tube, the flexible shaft being connected to a power source by a slip-clutch, in order to avoid damage to a power source or a flexible shaft, if the cleaning tool mounted on the flexible shaft hangs-up or gets stuck during a tube cleaning.

BACKGROUND OF THE INVENTION

In many industries, it is quite common to use tubular mechanisms or assemblies to carry out reactions or perform other necessary functions. This is especially true in the heating, ventilating and air conditioning industry (commonly called HVAC). Such procedures are most efficiently run when the tubes are clear or clean. Sometimes, in fact usually and almost always, deposits form within the tubes during the course of the reactions and cause the tubes to fill with residue.

Shaft driven tube cleaners are known to be suitable for cleaning the tubes, which are customarily used in the HVAC industry. More particularly, a shaft driven tube cleaner may be used to carry out maintenance functions on a boiler or a chiller, or a related sheet and tube heat exchanger. Clean tube surfaces, especially interior surfaces are required for maximum designed heat transfer, thus insuring efficient operation of the heat transfer device, in the tubes are mounted.

Tube cleaning shafts suffer damage from over torquing, especially when the cleaning tool mounted on the end of the flexible shaft gets stuck in deposits within the tube. There is no good way to know, that the tube cleaning shaft is being over torqued, until after the damage is done, even to a point beyond repair. It is desirable to prevent this damage and to provide information and immediate activation by the operator of relief procedures as soon as the over torquing occurs.

It is also desired to provide for the cleaning shaft to be mounted easily to the power unit. If such mounting can be simplified, great advantages can be obtained. Not only is the tool more easily used, cleaning efficiency is greatly improved at reasonable expense. For example, a special power unit is not required.

One example of a prior art tube cleaning system 110 can be seen by considering FIG. 1 and FIG. 2 together. The cleaning system 110 has a power unit 112 and flexible shaft assembly 114. One prior art coupling unit 116 for use with power unit 112, as shown in FIG. 2, has a drive shaft 120, which receives standard coupling 122 in male/female relationship. Shaft anchor pin 124 passes through both standard coupling aperture 126 and the concentric drive shaft aperture 128, locking drive shaft 120 and standard coupling 122 together.

When a cleaning tool 108 mounted on the flexible shaft assembly 114 locks up during a tube cleaning process for tube 106, stress is put first on standard coupling 122, and then on power unit 112 as well as flexible shaft assembly 114. At least one of those parts may be ruined if power is not terminated immediately.

If over torquing can be avoided, both damage to power source and damage to the flexible shaft can be avoided. Thus, some manner of detecting over torquing before damage is done is extremely useful.

SUMMARY OF THE INVENTION

Among the many objectives of this invention is the provision of a spring-loaded slip clutch device for use with a tube cleaning device, which protects both the flexible tube cleaning shaft and the power supply, when the cleaning tool on the end of the flexible tube cleaning shaft becomes stuck.

Another objective of this invention is to provide a spring-loaded slip clutch device, which minimizes over torquing of a flexible shaft.

Yet another objective of this invention is to provide a spring-loaded slip clutch device, which minimizes damage to the power unit of a tube cleaning device.

Still another objective of this invention is to provide a spring-loaded slip clutch device, which causes a sound on the occurrence of over torquing.

Additionally, an objective of this invention is to provide a spring-loaded slip clutch device, which causes a visible recognition the occurrence of over torquing.

A further objective of this invention is to provide a spring-loaded slip clutch device, which causes an action on the occurrence of over torquing.

A still further objective of this invention is to provide an adjustable spring-loaded slip clutch device, which minimizes over damage to a flexible shaft.

Yet a further objective of this invention is to provide a method, which minimizes over torquing of a flexible shaft.

Another objective of this invention is to provide a method for cleaning an HVAC tube, which minimizes damage to a flexible shaft.

Yet another objective of this invention is to provide a method of minimizing damage to the power unit of a tube cleaning device.

Still another objective of this invention is to provide a method of causing a sound on the occurrence of over torquing.

Additionally, an objective of this invention is to provide a method for causing a visible recognition the occurrence of over torquing.

These and other objectives of the invention (which other objectives become clear by consideration of the specification, claims and drawings as a whole) are met by providing a clutch device adapted to fit onto a drive shaft of a standard water pressure cavity machine, the clutch device having a clutch body with a shaft receiving aperture at one end of the clutch body and a spring assembly at the other end of the clutch body, in order to permit holding of reciprocating jaws therein.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

The slip clutch device is secured onto the flexible drive shaft of a standard water pressure cavity machine or drive unit. The water pressure cavity machine may electric driven or air powered. Within the manifold for the drive unit, is the slip clutch device of this invention. The slip clutch device includes a clutch body.

At one end of the clutch body is a shaft receiving aperture. The shaft receiving aperture passes into the water pressure cavity and is locked onto the drive shaft by the shaft anchor pin. Oppositely disposed from the shaft anchor aperture on the clutch body is the spring assembly.

With the spring assembly on the clutch body are two enlarged cylindrical flanges, as an integral part of the clutch body. The cylindrical flanges have a larger diameter than the remaining part of the clutch body. Disposed therebetween and formed thereby is a slotted member. Within slotted member are two jaw apertures. Into the open jaw aperture fits the first clutch jaw. Into the opposing jaw aperture fits the second clutch jaw.

At least one clutch spring holds the clutch jaws in place. In the event that the flexible drive cable locks, the male square drive coupling on the female coupling collar pushes the clutch jaws out, thereby permitting free turning of the flexible shaft. In this fashion damage to the tube cleaning drive unit and the flexible shaft can be avoided.

Any combination or number of spring retainers can be used for jaw retaining pressure. As the number or strength of springs increases, jaw pressure increases. As the number or strength of springs decreases, jaw pressure decreases.

If desired, a spring cap permits the spring to be held in place. Such a cap is used when larger tubes are being cleaned. The slip mechanism is not required in the larger tubes, because locking of the cleaning device does not readily occur due to the size of the tube. A clutch spring retainer cap fits over the jaws and locks the clutch spring in place.

It is also desirable for the clutch device to be mounted easily to various manufactured drive units. This ease of mounting is accomplished by providing a half inch inside diameter female clutch drive end. This drive end accepts a universal one half inch drive shaft on most drive units. A preferred stainless steel construction of the clutch device of this invention for use with the flexible shaft resists corrosion. This clutch device also prevents corrosion damage by the drive unit.

Figure 1:
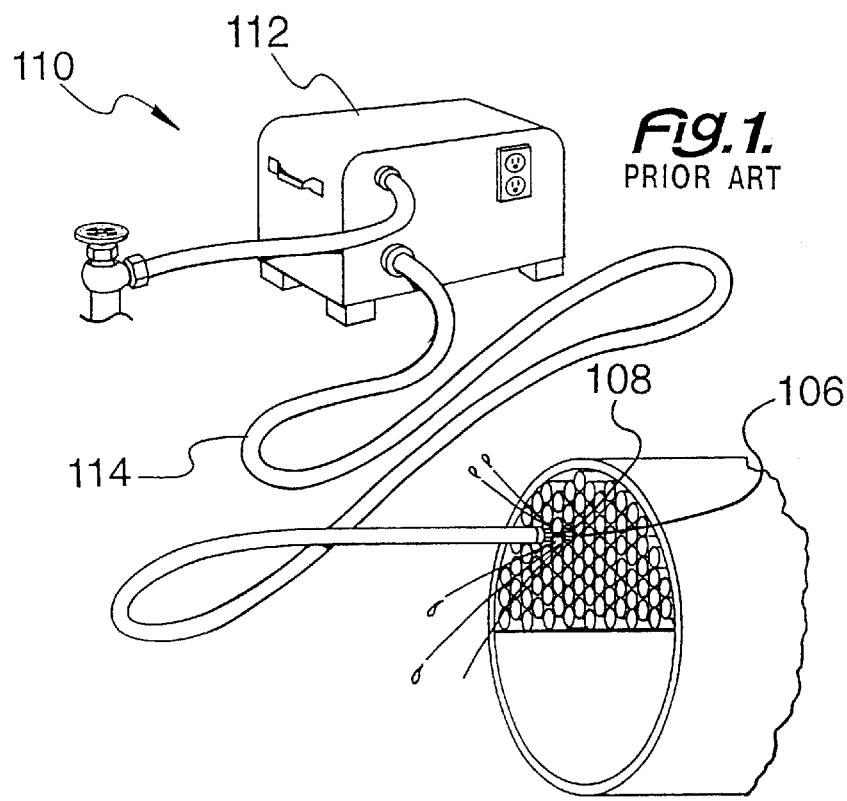
FIG. 1 depicts a tube cleaning system 110 with a power unit 112 and prior art flexible hose assembly 114.
Figure 2:
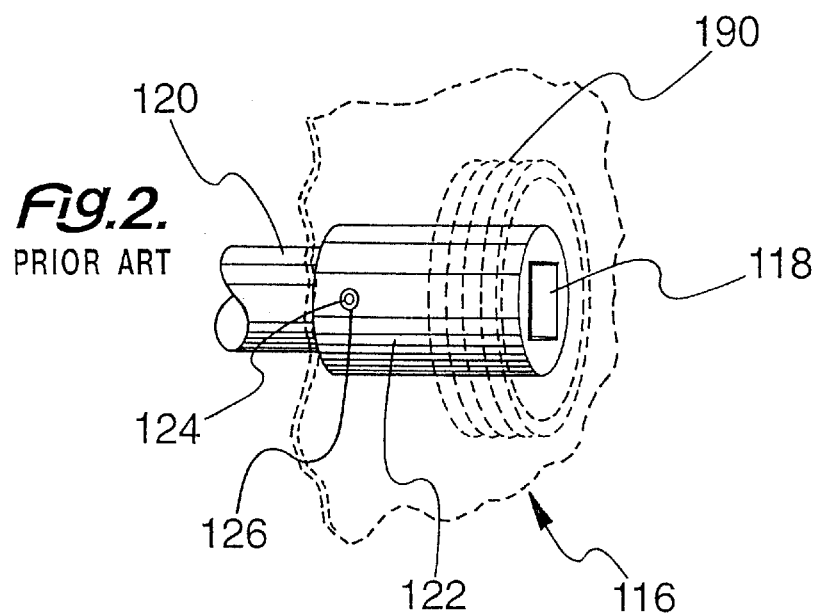
FIG. 2 depicts a prior art coupling unit 116 with standard square female receptacle 118 for use with power unit 112, such as is shown in FIG. 1.
Figure 3:
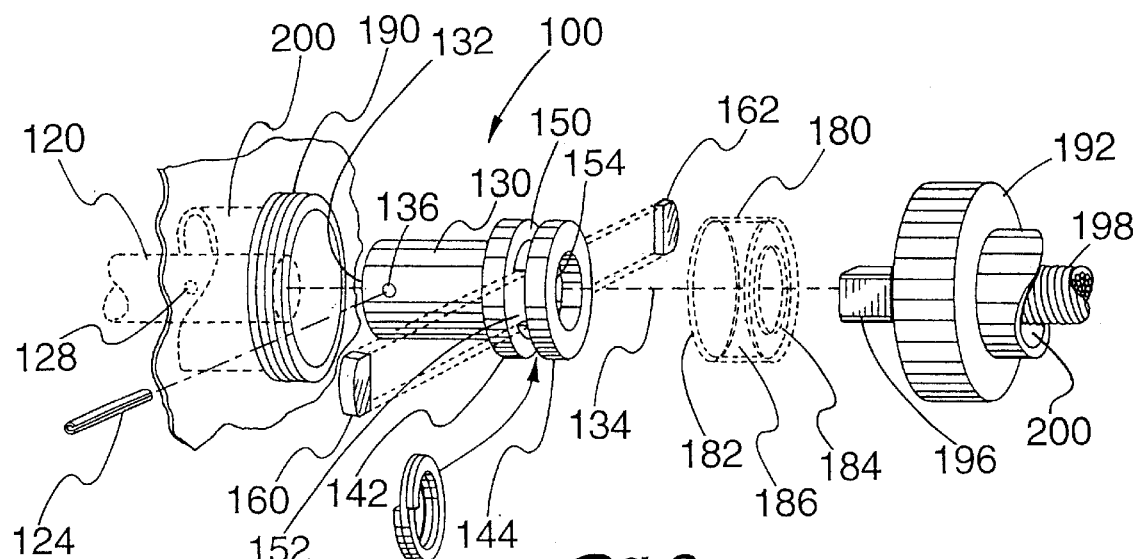
FIG. 3 depicts an exploded, perspective view of slip clutch device 100 of this invention, suitable for replacing prior art coupling unit 116, such as is shown in FIG. 2.
Figure 4:
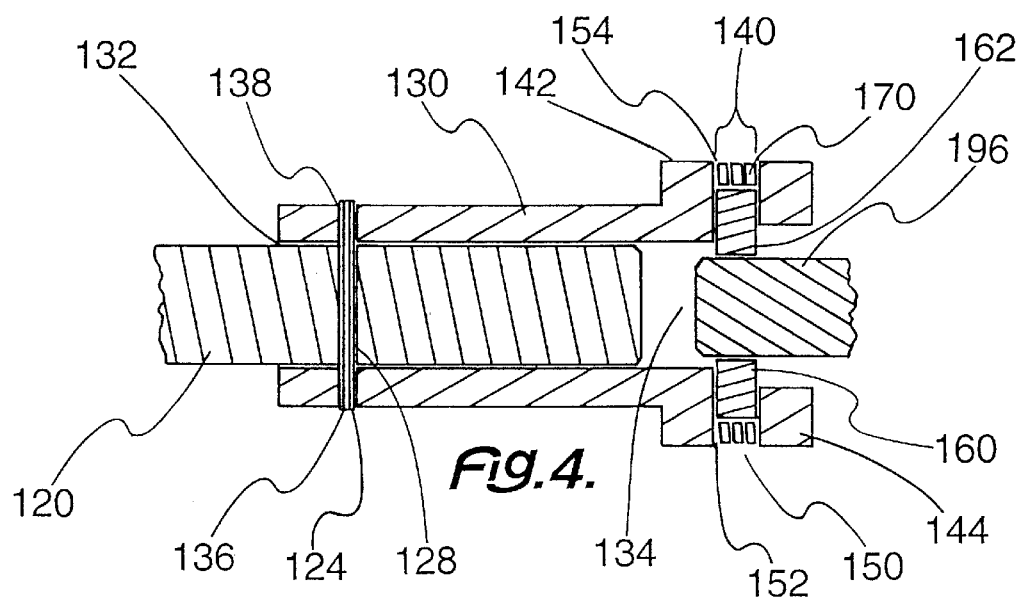
FIG. 4 depicts an assembled, side cross-sectional view of slip clutch device 100 of this invention.

Referring now to FIG. 3 and FIG. 4 to more particularly describe this invention, the slip clutch device 100 replaces standard coupling 122 in tube cleaning system 110. The slip clutch device 100 fits onto the drive shaft 120 of a standard water flush drive machine or power unit 112.

Within the slip clutch device 100 is a clutch body 130. At one end of the clutch body 130 is a shaft receiving aperture 132, preferably concentric with the cylindrical axis 134 of clutch body 130. The shaft receiving aperture 132 passes into the power unit 112 and is locked onto the drive shaft 120 by the shaft anchor pin 124.

Clutch body 130 includes a pair of shaft anchor apertures. First shaft anchor aperture 136 is oppositely disposed from second shaft anchor aperture 138 and concentric therewith. First shaft anchor aperture 136 and second shaft aperture 138 are also concentric with drive shaft aperture 128.

Oppositely disposed from the shaft anchor apertures 136 and 138 on the clutch body 130 is the spring assembly 140. Spring assembly 140 may include as many springs as desired. With the spring assembly 140 on the clutch body 130 are two enlarged cylindrical flanges. The first cylindrical flange 142 and the second cylindrical flange 144 are symmetrical have a larger diameter than the remaining part of the clutch body 130.

In other words, clutch body 130 has an enlarged area to support spring assembly 140. The enlarged area is formed by first cylindrical flange 142 and the second cylindrical flange 144 with slotted member 150 therebetween. Spring assembly 140, having at least two of clutch spring 170, fits in slotted member 150.

More particularly, disposed therebetween is a slotted member 150. Within slotted member 150 are two, oppositely disposed jaw apertures. Into the first jaw aperture 152 fits the first clutch jaw 160. Into the opposing second jaw aperture 154 fits the second clutch jaw 162. A single clutch spring 170 surrounds and holds the clutch jaw 160 and 162 in place, while respectively leaving clutch jaw 160 and 162 slidably mounted within first jaw aperture 152 and opposing second jaw aperture 154.

If desired, a clutch spring retainer cap 180 fits over the jaws 160 and 162 and locks the clutch spring 170 in place. Jaws 160 and 162 can reciprocate against clutch spring 170 as flexible hose assembly 114 as cleaning 108 is used in tube 106. In the event that the cleaning tool 108 on the flexible hose assembly 114 locks, the male square drive coupling 196 on the flexible shaft 198 pushes the clutch jaws 160 and 162 out, thereby permitting free turning of the flexible shaft assembly 114.

Clutch spring 170 forces clutch jaws 160 and 162 back and forth in a reciprocating fashion. Because clutch spring 170 surrounds clutch jaws 160 and 162 due to its circular structure, the reciprocation is believed to have an impact effect, which may also set flexible shaft assembly 114 and cleaning tool 108 free from the holding deposit.

In this fashion, damage to the water pressure device or power unit 112, and the water flush delivery hose or flexible shaft assembly 114 can be avoided. The reciprocating of clutch jaws 160 and 162 provides an audible indication of the lock up of flexible shaft assembly 114.

If desired, a spring cap 180 permits the clutch spring 170 to be more securely held in place. The spring 170 locks the jaws 160 and 162 in place, but yet permits the flexibility thereof in the event that the flexible cable or flexible shaft assembly 114 can be locked by using spring cap 180 or unlocked by removal thereof. Spring cap 180 has an open end 182 and a partially closed end 184. Partially closed end 184 receives flexible shaft assembly 114. Open end 182 permits cap side 186 to lock the spring 170 in place.

Without spring cap 180 in place, spring 170 or spring assembly 140 permits male square drive coupling 182 to exert outward pressure on clutch jaws 162 and 164. When such pressure exceeds the spring power, clutch jaws 162 and 164 separate and permit independent rotation.

It is also desired to provide for the flexible drive cable 198 of the flexible shaft assembly 114 to be mounted easily to slip clutch 100. This mounting is preferably accomplished by providing a half inch diameter shaft or male square drive coupling 196 on flexible shaft drive cable 198. The stainless steel construction of the tool of the flexible shaft or flexible shaft assembly 114 resists corrosion.

In operation, slip clutch device 100 fits between the power unit 112 and the hose assembly 114. On the power unit 112, is a male receptacle 190. Male receptacle 190 receives female receptacle 192. Male square drive coupling 196, on one end of flexible cable drive 198 is centrally located in female receptacle 192, is received between clutch jaws 162 and 164, and is held in position by female receptacle 192. Thus flexible cable drive 198 and can be rotated, while water (not shown) passes through water cavity 200. Thus slip clutch 100 of this invention provides a major improvement in the connection between power unit 112 and hose assembly 114.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. In a water pressure cavity machine having a flexible drive shaft for cleaning a tube, the improvement comprising:
   (a) a reciprocating clutch device being adapted to fit onto the flexible drive shaft;
   (b) the reciprocating clutch device being adapted to connect the flexible drive shaft to the water pressure cavity machine;
   (c) the clutch device having a clutch body;
   (d) a shaft receiving aperture being situated at a first end of the clutch body;
   (e) a spring assembly at a second end of the clutch body;
   (f) the first end of the clutch body being oppositely disposed from the second end of the clutch body;
   (g) a reciprocating jaw assembly being at the second end of the clutch body; and
   (h) the spring assembly supporting the reciprocating jaw assembly in the clutch body.

2. The water pressure cavity machine of claim 1 having the improvement further comprising:
   (a) the spring assembly including at least one spring;
   (b) the second end of the clutch body having a spring receiving slot; and
   (c) the spring receiving slot having at least one jaw receiving aperture.

3. The water pressure cavity machine of claim 2 having the improvement further comprising:
   (a) the at least one jaw receiving aperture including a first jaw receiving aperture and a second jaw receiving aperture;
   (b) a first jaw member being received in the first jaw receiving aperture; and
   (c) a second jaw member being received in the second jaw receiving aperture.

4. The water pressure cavity machine of claim 3 having the improvement further comprising:
   (a) a pin receiving aperture being situated adjacent to the first end of the clutch body; and
   (b) the pin receiving aperture being adapted to secure the reciprocating clutch device to the water pressure cavity machine.

5. The water pressure cavity machine of claim 4 having the improvement further comprising:
   (a) the pin receiving aperture having a pin axis;
   (b) the clutch body having a shaft axis of symmetry; and
   (c) the pin axis being substantially perpendicular to the shaft axis.

6. The water pressure cavity machine of claim 5 having the improvement further comprising:
   (a) a spring cap covering the spring assembly; and
   (b) the spring cap holding the spring assembly in position.

7. The water pressure cavity machine of claim 5 having the improvement further comprising:
   (a) the spring receiving slot being situated between a first cylindrical flange and a second cylindrical flange; and
   (b) the spring assembly being situated between the first cylindrical flange and the second cylindrical flange.

8. The water pressure cavity machine of claim 7 having the improvement further comprising:
   (a) a spring cap covering the spring assembly;
   (b) the spring cap having an open end and a partially closed end; and
   (c) the partially closed end being adapted to receive the flexible shaft.

9. A reciprocating clutch for a water pressure cavity machine with a flexible drive shaft for cleaning a tube, comprising:
   (a) the reciprocating clutch device being adapted to fit onto the flexible drive shaft;
   (b) the reciprocating clutch device being adapted to connect the flexible drive shaft to the water pressure cavity machine;
   (c) the clutch device having a clutch body;
   (d) a shaft receiving aperture being situated at a first end of the clutch body;
   (e) a spring assembly at a second end of the clutch body;
   (f) the first end of the clutch body being oppositely disposed from the second end of the clutch body; and
   (g) a reciprocating jaw assembly being at the second end of the clutch body.

10. The reciprocating clutch of claim 9 further comprising:
    (a) the spring assembly including at least one spring;
    (b) the second end of the clutch body having a spring receiving slot;
    (c) the spring receiving slot having at least one jaw receiving aperture; and
    (d) the spring assembly supporting the reciprocating jaw assembly in the clutch body.

11. The reciprocating clutch of claim 10 further comprising:
    (a) the at least one jaw receiving aperture including a first jaw receiving aperture and a second jaw receiving aperture;
    (b) a first jaw member being received in the first jaw receiving aperture; and
    (c) a second jaw member being received in the second jaw receiving aperture.

12. The reciprocating clutch of claim 11 further comprising:
    (a) a pin receiving aperture being situated adjacent to the first end of the clutch body; and
    (b) the pin receiving aperture being adapted to secure the reciprocating clutch device to the water pressure cavity machine.

13. The reciprocating clutch of claim 11 further comprising:
    (a) the pin receiving aperture having a pin axis;
    (b) the clutch body having a shaft axis of symmetry; and
    (c) the pin axis being substantially perpendicular to the shaft axis.

14. The reciprocating clutch of claim 13 further comprising:
    (a) the spring receiving slot being situated between a first cylindrical flange and a second cylindrical flange; and
    (b) the spring assembly being situated between the first cylindrical flange and the second cylindrical flange.

* * * * *